United States Patent
Bradbury et al.

(10) Patent No.: US 12,536,502 B2
(45) Date of Patent: Jan. 27, 2026

(54) PRODUCT DESIGN AND MANUFACTURE MANAGEMENT SYSTEM AND METHOD

(71) Applicant: STOKE Space Technologies, Inc., Kent, WA (US)

(72) Inventors: Brent Andrew Bradbury, Seattle, WA (US); Andrew Lapsa, Seattle, WA (US)

(73) Assignee: STOKE Space Technologies, Inc., Kent, WA (US)

( * ) Notice: Subject to any disclaimer, the term of this patent is extended or adjusted under 35 U.S.C. 154(b) by 0 days.

(21) Appl. No.: 18/786,544

(22) Filed: Jul. 28, 2024

(65) Prior Publication Data

US 2025/0037077 A1     Jan. 30, 2025

Related U.S. Application Data

(60) Provisional application No. 63/516,353, filed on Jul. 28, 2023.

(51) Int. Cl.
*G06Q 10/0875*  (2023.01)

(52) U.S. Cl.
CPC ............... *G06Q 10/0875* (2013.01)

(58) Field of Classification Search
CPC .................................... G06Q 10/0875
See application file for complete search history.

(56) References Cited

U.S. PATENT DOCUMENTS

| | | | |
|---|---|---|---|
| 6,115,646 A | 9/2000 | Fiszman et al. | |
| 6,279,009 B1 | 8/2001 | Smirnov et al. | |
| 6,338,053 B2 | 1/2002 | Uehara et al. | |
| 7,822,706 B1 | 10/2010 | Baltazar et al. | |
| 8,244,668 B1 | 8/2012 | Baltazar et al. | |
| 8,738,414 B1 | 5/2014 | Nagar et al. | |
| 9,348,489 B1 | 5/2016 | Chine et al. | |
| 9,629,928 B1 | 4/2017 | Olsen | |
| 10,852,712 B2 | 12/2020 | Ben-Bassat et al. | |

(Continued)

OTHER PUBLICATIONS

"How To Fix CPU Failure", 2022, https://ms.codes/en-gb/blogs/computer-hardware/how-to-fix-cpu-failure (Year: 2022).*

(Continued)

*Primary Examiner* — Allen C Chein
(74) *Attorney, Agent, or Firm* — Pillsbury Winthrop Shaw Pittman LLP

(57) ABSTRACT

Techniques of item assembly testing that include: obtaining assembly information; generating, based on the assembly information, a bill of materials (BOM) including a listing of parts corresponding to a configuration of parts defined by the assembly information; generating, based on the listing of parts, a set of reference designators; obtaining an item label set; generating, based on the item label set and the set of reference designators, an assembly bill of materials (ABOM) that includes the labels associated with the parts reference designators; generating, for a test of the item assembly, a record of the ABOM; obtaining test data for parts of the item assembly (the item assembly tested having a configuration specified the ABOM); and generating a test results ABOM including test data for the parts associated with the labels for the reference designators associated with the parts.

25 Claims, 10 Drawing Sheets

(56) References Cited

U.S. PATENT DOCUMENTS

| | | | |
|---|---|---|---|
| 2003/0065574 A1* | 4/2003 | Lawrence | G06Q 10/087 |
| | | | 705/26.82 |
| 2003/0217054 A1 | 11/2003 | Bachman et al. | |
| 2004/0015487 A1 | 1/2004 | Lin et al. | |
| 2004/0117795 A1 | 6/2004 | Wang et al. | |
| 2004/0205711 A1 | 10/2004 | Ishimitsu et al. | |
| 2008/0065448 A1 | 3/2008 | Hull et al. | |
| 2009/0281777 A1 | 11/2009 | Baeuerle et al. | |
| 2010/0106282 A1 | 4/2010 | Mackelprang et al. | |
| 2010/0322256 A1 | 12/2010 | Riley et al. | |
| 2011/0225565 A1 | 9/2011 | Van Velzen et al. | |
| 2011/0251975 A1* | 10/2011 | Evans | G06Q 10/10 |
| | | | 705/348 |
| 2014/0047028 A1 | 2/2014 | Buth | |
| 2015/0127412 A1 | 5/2015 | Kothandaraman et al. | |
| 2016/0154910 A1 | 6/2016 | Altare et al. | |
| 2020/0134001 A1 | 4/2020 | Kantamsetty et al. | |
| 2021/0192450 A1* | 6/2021 | Bachant | G07C 5/008 |

OTHER PUBLICATIONS

Owen-Hill, https://robodk.com/blog/electronic-product-testing/, Jan. 2022, https://robodk.com/blog/electronic-product-testing/ (Year: 2022).*

Murray, https://www.liveabout.com/bill-of-materials-2221363, Jan. 2019, https://www.liveabout.com/bill-of-materials-2221363 (Year: 2019).*

Eshuis, Rik, and Roel Wieringa. "Verification support for workflow design with UML activity graphs." Proceedings of the 24th international conference on Software engineering. 2002. (Year: 2002). pp. 166-176.

Chen, Sen, et al. "Top-down human-cyber-physical data fusion based on reinforcement learning." IEEE Access 8 (2020): 134233-134245. (Year: 2020). 13 Pages.

Tu, Y. L., S. Q. Xie, and J. J. Kam. "Rapid one-of-a-kind production." The International Journal of Advanced Manufacturing Technology 29 (2006): 499-510. (Year: 2006). pp. 499-510.

Apiliogullan, Lutfi. "Digital transformation in project-based manufacturing: Developing the ISA-95 model for vertical integration." International Journal of Production Economics 245 (2022): 108413. (Year: 2022). pp. 1-10.

Chinchanikar, Satish, and Avez A. Shaikh. "A review on machine learning, big data analytics, and design for additive manufacturing for aerospace applications." Journal of Materials Engineering and Performance 31.8 (2022): 6112-6130. (Year: 2022). pp. 1-19.

Notice of Allowance for related U.S. Appl. No. 18/361,607 (U.S. Pat. No. 11,823,108), dated Sep. 20, 2023. pp. 1-74.

Non-Final Office Action for related U.S. Appl. No. 18/490,510 (U.S. Pat. No. 11,977,999), dated Jan. 16, 2024. pp. 1-21.

Notice of Allowance for related U.S. Appl. No. 18/490,510 (U.S. Pat. No. 11,977,999), dated Jun. 6, 2024. pp. 1-9.

Non-Final Office Action for U.S. Appl. No. 18/625,561 dated Nov. 20, 2024.

Notice of Allowance for U.S. Appl. No. 18/625,561 dated Apr. 2, 2025, pp. 1-14.

* cited by examiner

PRODUCT DESIGN AND MANUFACTURE MANAGEMENT SYSTEM AND METHOD

RELATED APPLICATIONS

This application claims benefit of and priority to U.S. Provisional Patent Application No. 63/516,353 filed Jul. 28, 2023 and titled "PRODUCT DESIGN AND MANUFACTURE MANAGEMENT SYSTEM AND METHOD," the entirety of which is hereby incorporated by reference.

FIELD

Embodiments relate generally to product development and more particularly to product design, manufacture, testing, and implementation.

BACKGROUND

Inventory management often involves tracking of item availability and location. In the context of a parts supplier or consumer, this often includes tracking availability and location of parts, whether individual parts or parts of a larger product assembly. In the context of a product manufacturer, inventory management often includes systematic planning, tracking, and controlling of materials and components to produce and distribute finished products. For example, a product manufacturer may track availability of parts needed to manufacture a product, and coordinate inventory to ensure parts availability and use in the manufacture of larger assemblies.

SUMMARY

In some instances, inventory management involves the use of a bill of materials (BOM). A BOM typically includes a comprehensive list of raw materials, components, or sub-assemblies required to manufacture a product. A BOM often includes details such as part numbers, descriptions, quantities, and the like. BOMs can be especially useful in material planning, stock control, tracking and traceability, and cost management. In the context of material planning inventory managers may employ BOMs to forecast the quantity of each component needed, taking into account lead times, supplier reliability, and production schedules, which can help in ordering materials in advance to avoid delays. In the context of stock control, BOMs can help with maintaining optimal inventory levels to reduce excess inventory that can consume capital and storage space and avoid inventory shortages that can halt production. This may facilitate techniques like Just-In-Time (JIT) or Economic Order Quantity (EOQ) to optimize inventory levels. In the context of tracking and traceability, BOMs may provide for accurate tracking of materials from procurement to production, facilitating an understanding of what items are used and where. In the context of cost management, BOMs can aide effective inventory management, control costs by minimizing excess stock, reducing waste, and negotiating better prices with suppliers through bulk purchasing. BOMs can also be useful in other contexts, such as product testing. In the context of quality control, a BOM may provide tracking that ensures components and materials meet quality standards, for example, keeping track of batches and lots, especially for items subject to quality control and testing. In the context of material and product testing, BOMs may ensure that testing materials, such as prototypes or samples, are available, including managing the inventory of consumables used in testing processes. In the context of testing feedback, BOMs may help to track data from testing that can inform inventory management decisions, such as adjusting order quantities or selecting alternative suppliers or designs parts and products consistently fail quality or performance tests.

Different types of BOMS can be generated for use in different contexts. For example, an engineering BOM (EBOM) may focuses on the design perspective, detailing the components required based on the product's design. A manufacturing BOM (MBOM) may include additional details needed for production, such as tools, instructions, and assembly sequences, or variances in parts listed on an EBOM. An assembly BOM (ABOM) may reflect characteristics of an assembled product based on the EBOM and MBOM, including a listing of parts actually installed in the assembled product and associated information, such as notes concerning test or assembly. For example, a design engineering department may design a product based on engineering principals and generate a corresponding BOM (or "EBOM") that outlines what the product should include from an engineering perspective. A manufacturing engineering depart may review the EBOM and make revisions, such as removal, additions, or modifications of parts of the EBOM, to generate a revised BOM (or "MBOM") that outlines what the product should include from a manufacturing perspective. And, a product assembly department may generate an actual assembled product, in some instance using the same, or a variation of, parts specified in the EBOM or MBOM and populate an ABOM that reflects the parts actually used in the assembled product. The ABOM can be particularly useful in tracking parts locations and inventory and the makeup of products.

In many instances, despite incorporating a large amount of detail concerning materials used in the assembly/manufacture of a product, BOMs lack an ability to integrate with assembly and testing systems, especially those of producers that employ iterative manufacturing processes that can involve ongoing production variations, such as swapping of parts for testing, changes in design, or the like. For example, a traditional BOM may be relatively static and not readily account for late stage changes to an assembly just before testing. Also, as BOMs are modified over time, it may be difficult to track what, if any, BOM corresponds to an assemble product. Further, even where a BOM accurately represents an assembled product, where multiple versions of the same part are used in an assembly, it may be difficult to pinpoint which exact part is installed. As a result, it can be difficult or impossible to know which specific parts are contributing to the success or failure of a product in testing or use.

Provided are embodiments for improving product design, manufacture, testing, and implementation. In some embodiments, an interactive BOM is generated that includes reference designators for some or all of the listed components of a BOM. For example, an interactive BOM may include, for each part of a listing of parts of a BOM, a unique reference designator that enables components to be uniquely labeled and referenced. As an example, where a rocket employs a number of parts that include 13 identical thrusters that are each positioned in one of 13 available thruster locations, the interactive BOM may include 13 unique reference designators for the 13 thrusters, so they can each be uniquely identified. In some embodiments, labels can represent locations or other unique characteristics of a given component. This may, for example, enable the parts of a BOM to be uniquely identified relative to the parts of the BOM and the associated assembly, even where a common part used multiple times. Continuing with the above example, where a rocket employs 13 identical thrusters that are each positioned in one of 13 available thruster locations, the interactive BOM may include 13 unique reference designators for the 13 thrusters that are each labeled with a position (e.g., position 1, position 2, . . . and position 13), such that each of the 13 thrusters has a unique reference designator and label that enables specific identification of its location on the rocket.

In some embodiments, an interactive ABOM includes unique reference designators that further enable associating of component specific information. For example, where an ABOM includes a reference designator and associated label for a specific part, information concerning the part can be associated with the reference designator and associated label. Continuing with the above example, where testing of the rocket generates a set of thrust data for each of the 13 thrusters, each set of thrust data may be associated with the corresponding reference designator and associated label for each thruster. Thus, for example, an interactive ABOM may enable efficient tracking of components of products and associated characteristics, such as testing and performance data therefore. Such embodiments may, for example, facilitate specific identification of components and characteristics that enable appropriate action to be taken. For example, where the rocket fails to exhibit expected thrust performance, the 13 sets of thrust data can be reviewed to identify a failure of a thruster, the associated thruster and its location can be identified based on the corresponding reference designator and associated label, and the single thruster may be replaced without inspection or modification of the other 12 thrusters. As another example, reference designators may be helpful in exposing other areas of concern in addition to a direct part failure, such a logical design or operational issue. Continuing with the thruster example, where all 13 thrusters are connected in series, operational data associated with thruster reference designators and positions may reveal that the last three thrusters in a chain of communication are not functioning properly, exposing an issue with an unreliable data link toward the end of the series of thrusters. As a result, an issue that manifests itself as a thruster performance issue may be identified as a failure of the communication link. In such a scenario, the link may be repaired or replaced to efficiently and effectively address the root cause, as opposed to conducting several rounds of part swaps only to later realize the link was compromised. Or, even if the issue is not immediately addressed, the ability to observe performance of the corresponding parts locations over rounds of parts swaps and testing may enable engineers to deduce that the thrusters are not a root cause, and to focus investigation on other sources of failure, such as the communication link. These are just some examples of scenarios where the described techniques can be particularly helpful.

In some embodiments, a record (or "snapshot") of a BOM is obtained. For example, ahead of testing of a product or other operations for which the specific configuration of the product is useful to know, a snapshot of the ABOM for the product to be employed may be obtained and stored. This may, for example, enable reference back to the actual configuration of the product at the time of the operation. For example, an ABOM for a rocket to be tested may be stored after the rocket is assembled or otherwise configured for testing, the test may be conducted, and where testing reveals poor rocket performance, an engineer may reference the ABOM for the rocket to identify and assess the configuration that generated the poor performance. In some embodiments, the ABOM for a product serves as a reference for other operations. For example, in the case of an ABOM providing a listing of parts of an assembled rocket, the rocket may be configured to operate in accordance with the parts of the assembled rocket. In an instance where the assembled rocket includes a given type of sensor and a given type of actuator, control software of the rocket may be adjusted to map to the type of sensor and the type of actuator. For example, communication protocols may be selected to enable communication with the sensors and actuators, and operational commands for rocket operation may be selected to map to the current configuration of parts, including the type of sensors and actuators indicated by the ABOM. In the case of a rocket flight operation, a pre-flight configuration routine may include determining a flight configuration corresponding to the parts configuration specified by the "flight" ABOM (and its reference designators), and the determined flight configuration may be uploaded and employed by the rocket's control system during flight operations. Thus, for example, a product's configuration may be dynamically and automatically adjusted based on a configuration dictated by an ABOM.

Provided in some embodiments is an item assembly testing system including: an item test system adapted to obtain test data concerning testing of an assembled item; an item management system adapted to perform the following operations for item assembly testing: obtaining item assembly information defining a configuration of parts of an item assembly; generating, based on the item assembly information, an item bill of materials (BOM) for the item assembly, the BOM for the item assembly including a listing of parts corresponding to the arrangement of parts defined by the item assembly information; generating, based on the listing of parts, a set of reference designators including a reference designator for each part of the listing of parts; obtaining an item label set defining, for each reference designator of the set of reference designators, a label; generating, based on the item label set and the set of reference designators, an assembly bill of materials (ABOM), the ABOM including, for each part of the listing of parts, the label for the reference designator associated with the part; generating, for a test of the item assembly, a record of the ABOM; obtaining, based on the test of the item assembly conducted using the item test system, test data for one or more parts of the item assembly, the item assembly tested having a configuration corresponding to a configuration of parts specified the ABOM; and generating, based on the test data for one or more parts of the item assembly and the record of the ABOM, a test results ABOM including, for each of one or more parts of the item assembly, test data for the part associated with the label for the reference designator associated with the part.

In some embodiments, one or more parts of the item assembly is modified based on the test results ABOM. In some embodiments, the BOM for the item assembly is modified based on the test results ABOM. In some embodiments, a part of the item assembly is modified to generate a modified item assembly, the operations further including: receiving part information indicating the modification of the part of the item assembly; generating, based on the part information indicating the modification of the part of the item assembly, a modified ABOM reflecting the modification of the part of the item assembly; generating, for a test of the modified item assembly, a record of the modified ABOM; obtaining, based on the test of the modified item assembly, test data for one or more parts of the modified item assembly; generating, based on the test data for one or more parts of the modified item assembly and the record of the modified ABOM, a second test results ABOM including, for each of one or more parts of the modified item assembly, test data for the part associated with the label for the reference designator associated with the part. In some embodiments, the record of the ABOM is generated responsive of occurrence of an event. In some embodiments, the operations further including: determining an event time corresponding to a time that testing of the item assembly is scheduled to occur, where the record of the ABOM is generated at the event time such that the ABOM corresponds to a version of the item assembly subject to the test. In some embodiments, the operations further including: for one or more parts of the item assembly: receiving, part information concerning an actual part implemented for the part, where the ABOM includes the part information associated with the label of the reference designator associated with the part. In some embodiments, the part information includes metadata for the actual part implemented for the part. In some embodiments, the operations further including: for one or more parts of the item assembly: receiving part information indicating information concerning an actual part implemented for the part; determining, based on the information concerning the actual part implemented for the part, a part match or mismatch, where the ABOM includes an indication of the part match or mismatch associated with the label for the reference designator associated with the part.

Provided in some embodiments is a method of item assembly testing including: obtaining item assembly information defining a configuration of parts of an item assembly; generating, based on the item assembly information, an item bill of materials (BOM) for the item assembly, the BOM for the item assembly including a listing of parts corresponding to the arrangement of parts defined by the item assembly information; generating, based on the listing of parts, a set of reference designators including a reference designator for each part of the listing of parts; obtaining an item label set defining, for each reference designator of the set of reference designators, a label; generating, based on the item label set and the set of reference designators, an assembly bill of materials (ABOM), the ABOM including, for each part of the listing of parts, the label for the reference designator associated with the part; generating, for a test of the item assembly, a record of the ABOM; obtaining, based on the test of the item assembly, test data for one or more parts of the item assembly, the item assembly tested having a configuration corresponding to a configuration of parts specified the ABOM; and generating, based on the test data for one or more parts of the item assembly and the record of the ABOM, a test results ABOM including, for each of one or more parts of the item assembly, test data for the part associated with the label for the reference designator associated with the part. In some embodiments, one or more parts of the item assembly is modified based on the test results ABOM. In some embodiments, the BOM for the item assembly is modified based on the test results ABOM. In some embodiments, a part of the item assembly is modified to generate a modified item assembly, the operations further including: receiving part information indicating the modification of the part of the item assembly; generating, based on the part information indicating the modification of the part of the item assembly, a modified ABOM reflecting the modification of the part of the item assembly; generating, for a test of the modified item assembly, a record of the modified ABOM; obtaining, based on the test of the modified item assembly, test data for one or more parts of the modified item assembly; generating, based on the test data for one or more parts of the modified item assembly and the record of the modified ABOM, a second test results ABOM including, for each of one or more parts of the modified item assembly, test data for the part associated with the label for the reference designator associated with the part In some embodiments, the record of the ABOM is generated responsive of occurrence of an event. In some embodiments, further including: determining an event time corresponding to a time that testing of the item assembly is scheduled to occur, where the record of the ABOM is generated at the event time such that the ABOM corresponds to a version of the item assembly subject to the test. In some embodiments, further including: for one or more parts of the item assembly: receiving, part information concerning an actual part implemented for the part, where the ABOM includes the part information associated with the label of the reference designator associated with the part In some embodiments, the part information includes metadata for the actual part implemented for the part. In some embodiments, further including: for one or more parts of the item assembly: receiving part information indicating information concerning an actual part implemented for the part; determining, based on the information concerning the actual part implemented for the part, a part match or mismatch, where the ABOM includes an indication of the part match or mismatch associated with the label for the reference designator associated with the part.

Provided in some embodiments is a non-transitory computer readable storage medium including program instructions stored thereon that are executable by a processor to perform the described method operations for item assembly testing.

Provided in some embodiments is a non-transitory computer readable storage medium including program instructions stored thereon that are executable by a processor to perform the following operations for item assembly testing: obtaining item assembly information defining a configuration of parts of an item assembly; generating, based on the item assembly information, an item bill of materials (BOM) for the item assembly, the BOM for the item assembly including a listing of parts corresponding to the arrangement of parts defined by the item assembly information; generating, based on the listing of parts, a set of reference designators including a reference designator for each part of the listing of parts; obtaining an item label set defining, for each reference designator of the set of reference designators, a label; generating, based on the item label set and the set of reference designators, an assembly bill of materials (ABOM), the ABOM including, for each part of the listing of parts, the label for the reference designator associated with the part; generating, for a test of the item assembly, a record of the ABOM; obtaining, based on the test of the item assembly, test data for one or more parts of the item assembly, the item assembly tested having a configuration corresponding to a configuration of parts specified the ABOM; and generating, based on the test data for one or more parts of the item assembly and the record of the ABOM, a test results ABOM including, for each of one or more parts of the item assembly, test data for the part associated with the label for the reference designator associated with the part.

Although certain embodiments are described in the context of a certain types of items, such as a rocket and its components, for the purpose of explanation, embodiments may be employed in any suitable context. For example, embodiments may be employed in the automotive industry, the pharmaceutical industry, or the like.

Figure 1:
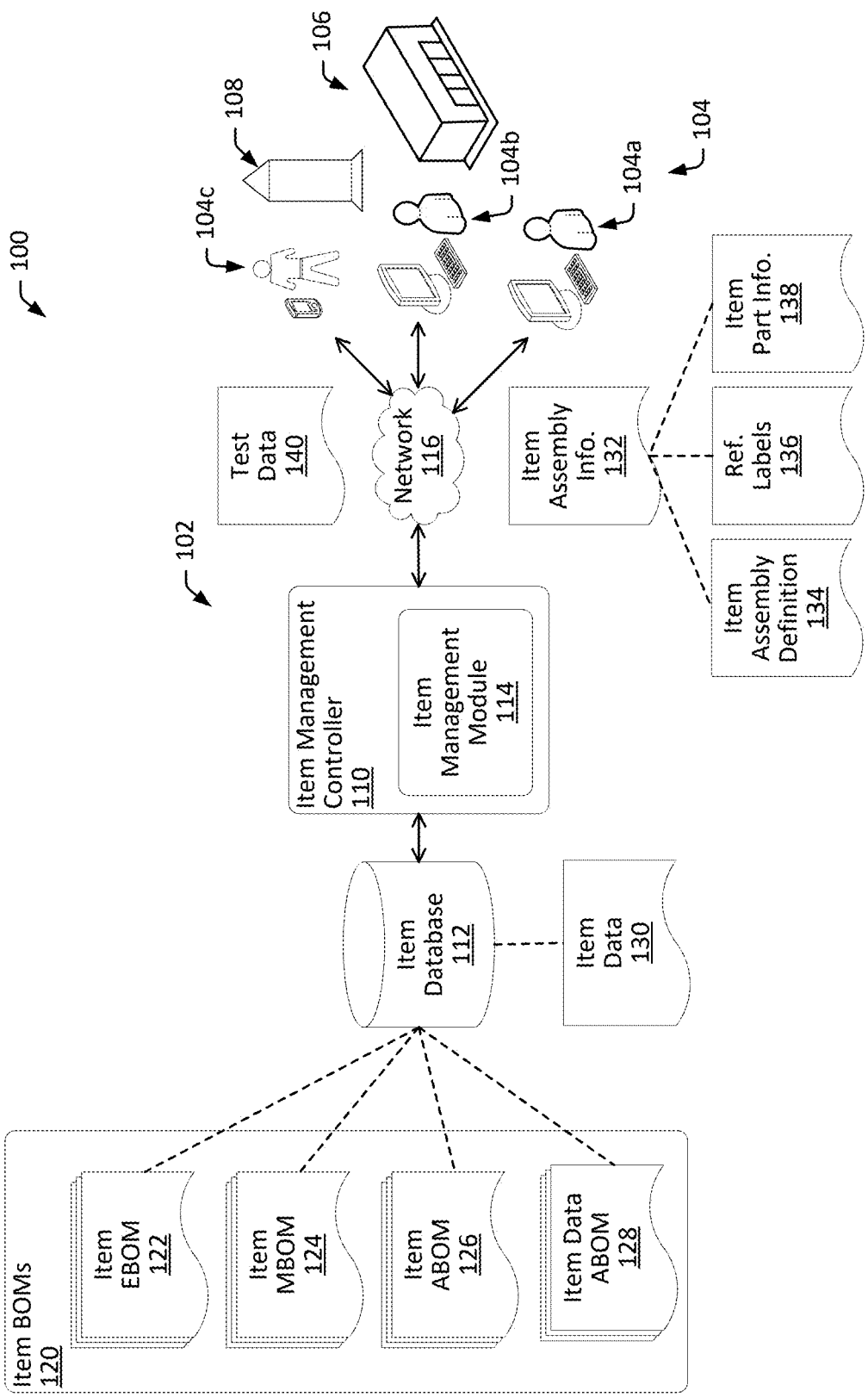
FIG. 1 is diagram that illustrates an item environment in accordance with one or more embodiments.

While this disclosure is susceptible to various modifications and alternative forms, specific example embodiments are shown and described. The drawings may not be to scale. It should be understood that the drawings and the detailed description are not intended to limit the disclosure to the particular form disclosed, but are intended to disclose modifications, equivalents, and alternatives falling within the spirit and scope of the present disclosure as defined by the claims.

DETAILED DESCRIPTION

Described are embodiments of product design, manufacture, testing, and implementation. In some embodiments, an interactive BOM is generated that includes reference designators for some or all of the listed components of a BOM. For example, an interactive BOM may include, for each part of a listing of parts of a BOM, a unique reference designator that enables components to be uniquely labeled and referenced. As an example, where a rocket employs a number of parts that include 13 identical thrusters that are each positioned in one of 13 available thruster locations, the interactive BOM may include 13 unique reference designators for the 13 thrusters, so they can each be uniquely identified. In some embodiments, labels can represent locations or other unique characteristics of a given component. This may, for example, enable the parts of a BOM to be uniquely identified relative to the parts of the BOM and the associated assembly, even where a common part is used multiple times. Continuing with the above example, where a rocket employs 13 identical thrusters that are each positioned in one of 13 available thruster locations, the interactive BOM may include 13 unique reference designators for the 13 thrusters that are each labeled with a position (e.g., position 1, position 2 . . . and position 13), such that each of the 13 thrusters has a unique reference designator and label that enables specific identification of its location on the rocket.

In some embodiments, an interactive ABOM includes unique reference designators that further enable associating of component specific information. For example, where an ABOM includes a reference designator and associated label for a specific part, information concerning the part can be associated with the reference designator and associated label. Continuing with the above example, where testing of the rocket generates a set of thrust data for each of the 13 thrusters, each set of thrust data may be associated with the corresponding reference designator and associated label for each thruster. Thus, for example, an interactive ABOM may enable efficient tracking of components of products and associated characteristics, such as testing and performance data therefore. Such embodiments may, for example, facilitate specific identification of components and characteristics that enable appropriate action to be taken. For example, where the rocket fails to exhibit expected thrust performance, the 13 sets of thrust data can be reviewed to identify a failure of a thruster, the associated thruster and its location can be identified based on the corresponding reference designator and associated label, and the single thruster may be replaced without inspection or modification of the other 12 thrusters. As another example, reference designators may be helpful in exposing other areas of concern in addition to a direct part failure, such a logical design or operational issue. Continuing with the thruster example, where all 13 thrusters are connected in series, operational data associated with thruster reference designators and positions may reveal that the last three thrusters in a chain of communication are not functioning properly, exposing an issue with an unreliable data link toward the end of the series of thrusters. As a result, an issue that manifests itself as a thruster performance issue may be identified as a failure of the communication link. In such a scenario, the link may be repaired or replaced to efficiently and effectively address the root cause, as opposed to conducting several rounds of part swaps only to later realize the link was compromised. Or, even if the issue is not immediately addressed, the ability to observe performance of the corresponding parts locations over rounds of parts swaps and testing may enable engineers to deduce that the thrusters are not a root cause, and to focus investigation on other sources of failure, such as the communication link. These are just some examples of scenarios where the described techniques can be particularly helpful.

In some embodiments, a record (or "snapshot") of a BOM is obtained. For example, ahead of testing of a product or other operations for which the specific configuration of the product is useful to know, a snapshot of the ABOM for the product to be employed may be obtained and stored. This may, for example, enable reference back to the actual configuration of the product at the time of the operation. For example, an ABOM for a rocket to be tested may be stored after the rocket is assembled or otherwise configured for testing, the test may be conducted, and where testing reveals poor rocket performance, an engineer may reference the ABOM for the rocket to identify and assess the configuration that generated the poor performance. In some embodiments, the ABOM for a product serves as a reference for other operations. For example, in the case of an ABOM providing a listing of parts of an assembled rocket, the rocket may be configured to operate in accordance with the parts of the assembled rocket. In an instance where the assembled rocket includes a given type of sensor and a given type of actuator, control software of the rocket may be adjusted to map to the type of sensor and the type of actuator. For example, communication protocols may be selected to enable communication with the sensors and actuators, and operational commands for rocket operation may be selected to map to the current configuration of parts, including the type of sensors and actuators indicated by the ABOM. In the case of a rocket flight operation, a pre-flight configuration routine may include determining a flight configuration corresponding to the parts configuration specified by the "flight" ABOM (and its reference designators), and the determined flight configuration may be uploaded and employed by the rocket's control system during flight operations. Thus, for example, a product's configuration may be dynamically and automatically adjusted based on a configuration dictated by an ABOM.

Although certain embodiments are described in the context of a certain types of items, such as a rocket and its components, for the purpose of explanation, embodiments may be employed in any suitable context. For example, embodiments may be employed in the automotive industry, the pharmaceutical industry, or the like.

FIG. 1 is diagram that illustrates an item environment 100 in accordance with one or more embodiments. In the illustrated embodiment, environment 100 includes an item management system (or "management system") 102, users 104 (e.g., users 104a-104c), an item test environment ("test environment") 106, and an assembled item ("product") 108 (e.g., formed of an assembly of parts). Management system 102 includes an item management controller ("controller") 110 and an item database ("database 112") 112. Item controller 110 may, for example, include an item management module 114 for executing some or all of the operational aspects described with regard to controller 110. In some embodiments, entities of environment 100, such as controller 110 and users 104 are communicatively coupled by way of a communications network ("network") 116 (e.g., the Internet, wired/wireless network, a wide area network, a local area network, or the like). In some embodiments, controller 110 includes or otherwise employs a computer system that is the same as or similar to computer system 1000 described with regard to at least FIG. 8. In some embodiments, one or more of users 104 includes or otherwise employs a computer system that is the same as or similar to computer system 1000 described with regard to at least FIG. 8.

In some embodiments, management system 102 is operable to generate item BOMs 120 (e.g., including item EBOMS 122, item MBOMS 124, item ABOMS 126 and item data BOMs 128). BOMs 120 may be generated based on corresponding item data 130, such as item assembly information 132 (e.g., an item assembly definition 134, item reference labels 136, and item part information 138) or item test data ("test data") 140. Item data 130, associated BOMs 120 and other relevant data may be stored in database 112. In some embodiments, item data 130 includes metadata for parts or assemblies, such as part/product type, source, status (e.g., good/bad) maintenance documentation, current/historical location, user notes/comments, date/location of manufacture, expiration date, or the like. Such metadata may, for example, be provided by way of item assembly information 132, such as item reference labels 136, item part information 138, or test data 140 provided by a user 104, or other entity, for corresponding parts of an item assembly definition 134.

In some embodiments, a BOM 120, such as EBOM 122, MBOM 124 or ABOM 126 is generated based on item assembly information 132 provided by one or more users 104 or another entity. For example, user 104a, such as an engineer, may provide, to controller 110, an item assembly definition 134 that defines a hierarchical listing of items (or "parts") for an item assembly (or "product") 108, and may provide reference labels 136 defining unique identifiers (e.g., names) for individual parts of product 108. In such an embodiment, item management module 114 may generate, based on item assembly definition 134 and reference labels 136, a corresponding BOM, such as EBOM 122, MBOM 124 or ABOM 126, as described here. Moreover, a user 104, such as an assembly technician, may provide item part information 138 (e.g., by populating part information fields of ABOM 126 with part information, such as the part number and serial/lot number, to indicate actual parts installed in the product for the listed parts). In such an embodiment, item management module 114 may populate ABOM 126 in accordance with the provided item part information 138 and assess data of ABOM 126 for any errors (e.g., "mismatches") of the parts of the assembled product 108 as described. In some embodiments, a snapshot of a BOM (e.g., a version of the BOM at a given point in time) is recorded, and the snapshot can be used as a basis for assessment of the associated product and associated data. For example, a snapshot of ABOM 126 for an assembled version of product 108 may be acquired shortly before testing of product 108, test data 140 for one or more parts of product 108 may be acquired during testing, and item management module 114 may generate an item data (or "test results") ABOM 128 that associates subsets of test data 140 (e.g., for certain parts of product 108) with corresponding labels 136 for those parts. In such an embodiment, labels 136 and results of the testing may be associated with the configuration of product 108 (e.g., an arrangement/positioning of parts) specified in the snapshot, which may, in turn, enable users 104 or other entities to quickly assess performance of product 108 and its individual parts in the as-tested configuration.

Figure 2B:
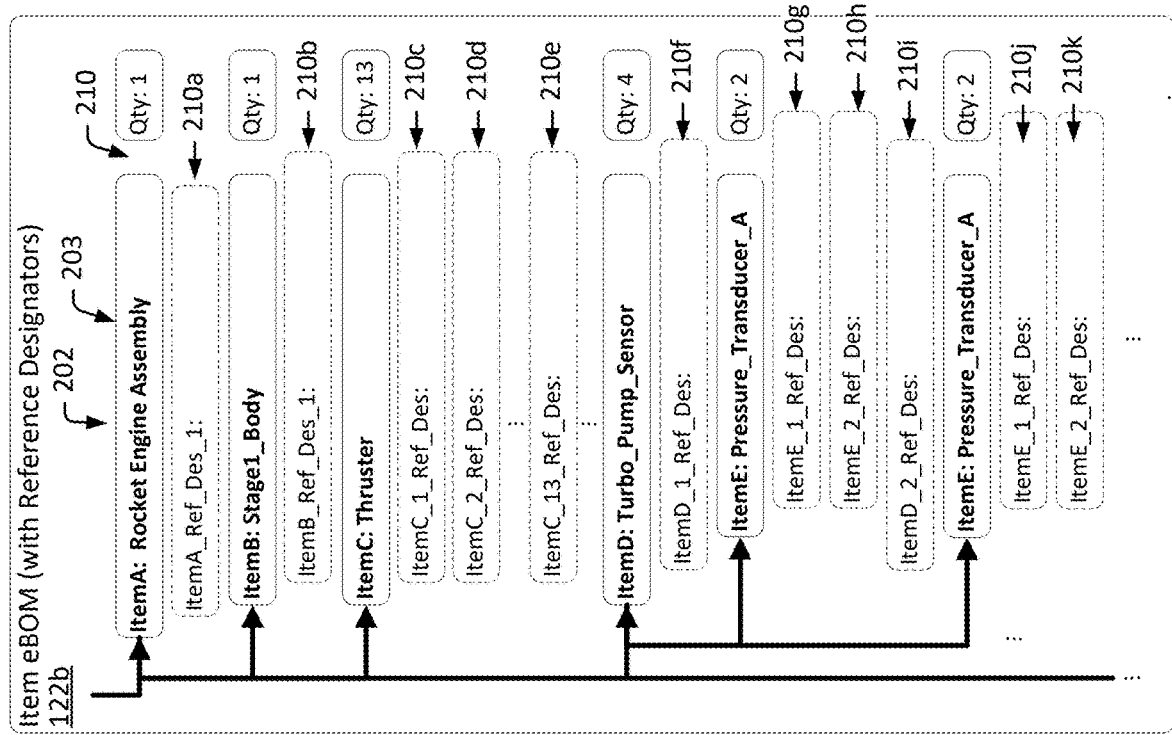
FIGS. 2A-2C are diagrams that illustrate variations of an EBOM in accordance with one or more embodiments.
Figure 2A:
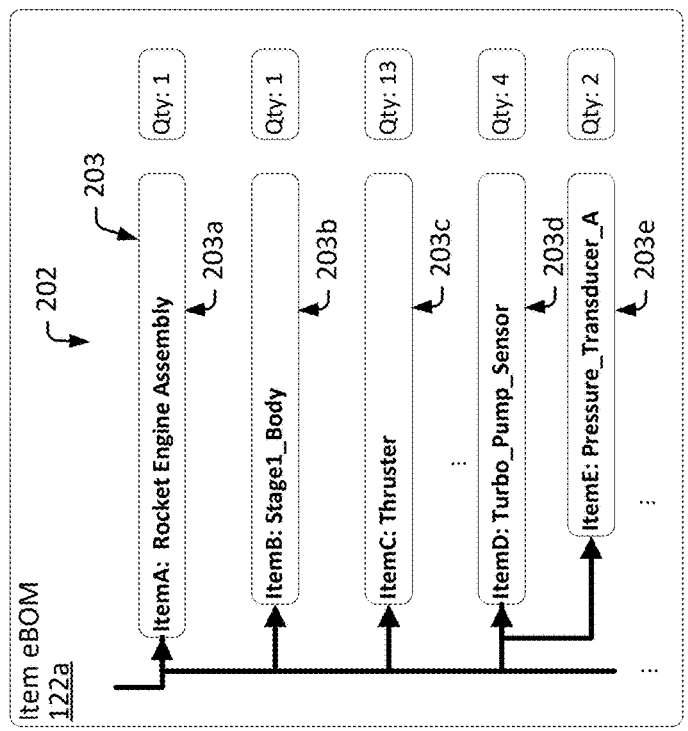
Figure 2C:
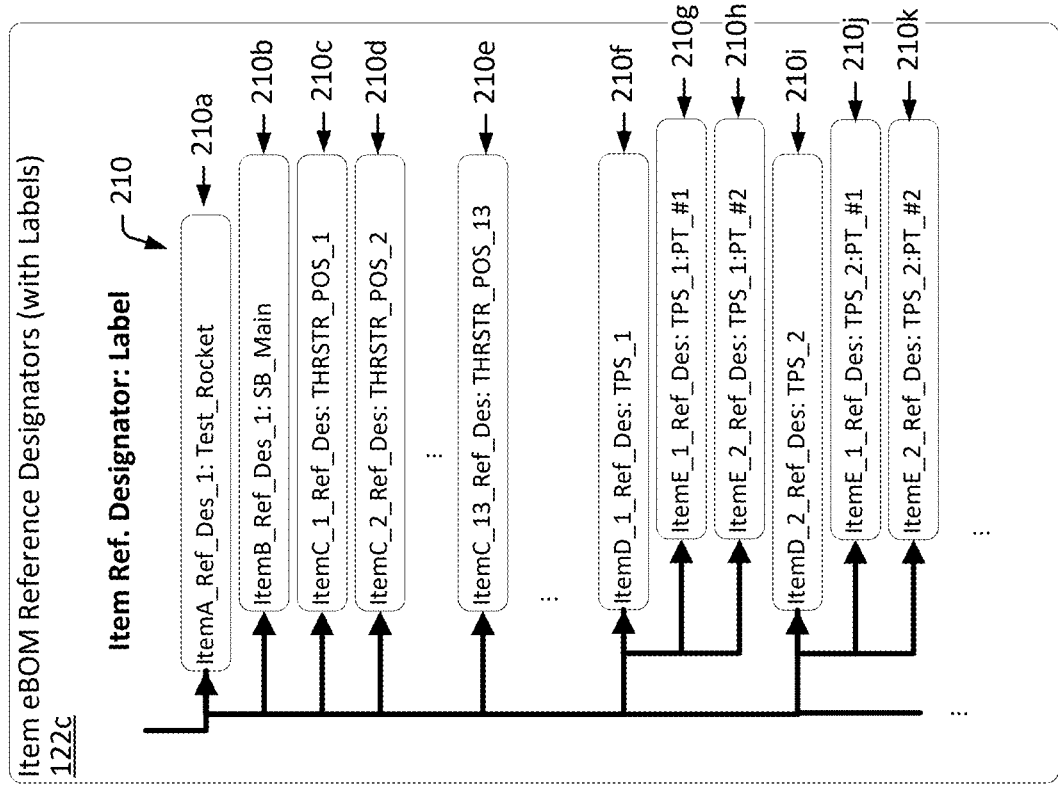

FIGS. 2A-2C are diagrams that illustrate various EBOMs 122 in accordance with one or more embodiments. FIG. 2A is a diagram that illustrates an EBOM 122a including a hierarchical listing of items (or "parts") 202 for an item assembly (or "product") (e.g., a rocket engine assembly), with each item (or "part") including a corresponding quantity indicative of the number of the respective part present. For example, hierarchical listing of parts 202 indicates use of one of "rocket engine assembly," one of "stage1_body," thirteen of "thruster," four of "Turbo_Pump_Sensor," and a total of eight of "Pressure_Transducer_A" (e.g., two for each of the four "Turbo_Pump_Sensor"). Each of the parts is represented by a corresponding item designator (or "part designator") 203 (e.g., part designators 203a-203e), such as "ItemC:Thruster" parts designator 203c, that each correspond to one or more parts of the associated product (e.g., to the 13 thrusters of the rocket engine assembly).

FIG. 2B is a diagram that illustrates an EBOM 122b including a hierarchical listing of items (or "parts") 202 for an item assembly (or "product") (e.g., the rocket engine assembly), along with a listing of respective reference designators 210. For example, embedded in hierarchical listing of parts 202 (which is similar to that described with regard to FIG. 2A), EBOM 122b includes a corresponding set of reference designators 210, which includes a respective reference designator 210a-210k for each of the parts of the hierarchical listing of parts. Referring to the thirteen of "thruster," for example, thirteen respective reference designators 210 are provided (represented by listed reference designators 210c-210c, including reference designator identifiers "ItemC_1_Ref_Des", "ItemC_2_Ref_Des", and "ItemC_13_Ref_Des"). As illustrated, each of the reference designators 210 includes a label field (e.g., shown as a blank field following the listed reference designator identifier), which may be populated with reference designator labels (or "labels") by a user 104, or the like, as described here. Although set of reference designators 210 is shown as embedded within hierarchical listing of parts 202 for the purpose of illustration, embodiments may employ set of reference designators 210 provided separate from hierarchical listing of parts 202 (e.g., as an independent listing similar to that illustrated at FIGS. 4A, 4B and 5).

FIG. 2C is a diagram that illustrates an EBOM 122c including a hierarchical listing of completed reference designators 210, including reference designator identifiers accompanied by corresponding reference designator labels. Referring to the thirteen of "thruster," for example, thirteen respective reference designators 210 are provided (represented by listed reference designators 210c-210e, including reference designator identifiers of "ItemC_1_Ref_Des", "ItemC_2_Ref_Des", and "ItemC_13_Ref_Des", and corresponding labels of "THRSTR_POS_1", "THRSTR_POS_2", and THRSTR_POS_13. As described, each reference designator label field (e.g., the field following the listed reference designator identifier for providing a unique label) may be populated by a user 104 or the like (e.g., by way of interaction with a graphical user interface served by controller 110 to a computer employed by user 104 and displayed thereon). Although set of reference designators 210 is shown as independent of hierarchical listing of parts 202 for the purpose of illustration, embodiments may employ set of reference designators 210 provided embedded with hierarchical listing of parts 202 (e.g., as an embedded listing similar to that illustrated at FIGS. 2B and 3B).

Figure 3B:
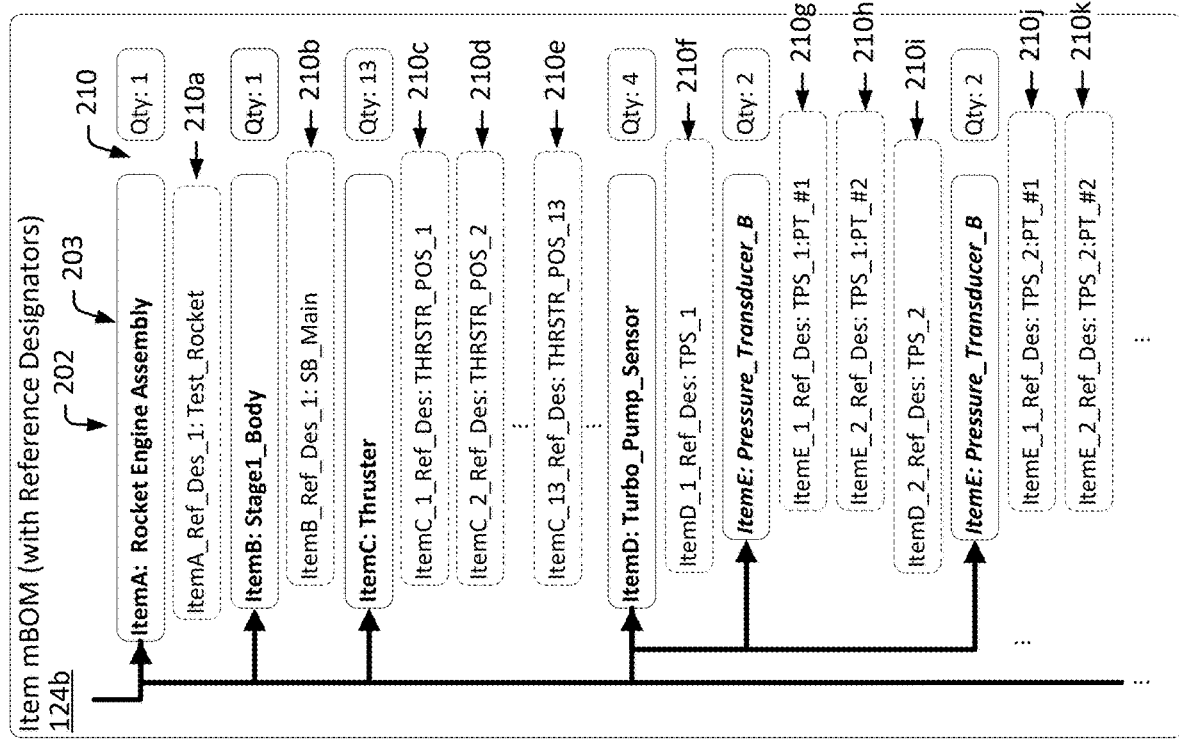
FIGS. 3A and 3B are diagrams that illustrate variations of an MBOM in accordance with one or more embodiments.
Figure 3A:
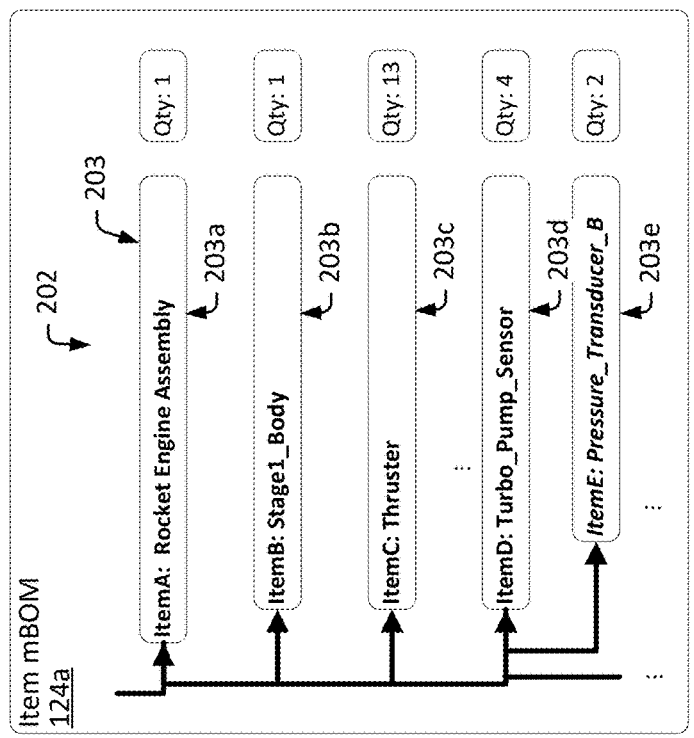

In some instances, an EBOM is modified to generate a modified BOM, or a completely new BOM based thereon. For example, a design engineering department may design a rocket engine assembly product based on engineering principals and generate corresponding EBOM 122 that outlines what the product should include from an engineering perspective. For example, a first user 104a (e.g., an engineer) may design a rocket engine assembly and generate corresponding EBOM 122, including populating reference labels for set of reference designators 210 corresponding to hierarchical listing of parts 202 of EBOM 122. A manufacturing engineering depart may review EBOM 122 and make revisions, such as removal, additions or modifications of parts of EBOM 122, to generate a revised BOM, such as an MBOM 124 that outlines what the product should include from a manufacturing perspective. For example, a second user 104b (e.g., a manufacturing engineer) may review the rocket engine assembly and corresponding EBOM 122, determine that Type A pressure transducer (e.g., "ItemE:Pressure_Transducer_A") has been superseded by a Type B pressure transducer, modify EBOM 122 to generate a corresponding MBOM 124 including a Type B pressure transducer part substituted for the Type A pressure transducer part due availability, physical fitment issues, or the like). FIGS. 3A and 3B are diagrams that illustrate variations of an MBOM in accordance with one or more embodiments. FIG. 3A (similar to FIG. 2A) is a diagram that illustrates an MBOM 124a including a hierarchical listing of parts 202 for a rocket engine assembly including a Type B pressure transducer part (e.g., "ItemE:Pressure_Transducer_B") substituted for the Type A pressure transducer part (e.g., "ItemE:Pressure_Transducer_A"). FIG. 3B (similar to FIG. 2B) is a diagram that illustrates an MBOM 124b corresponding to including a hierarchical listing of parts 202 for a rocket engine assembly including a Type B pressure transducer part (e.g., "ItemE:Pressure_Transducer_B") substituted for a Type A pressure transducer part (e.g., "ItemE:Pressure_Transducer_A"), along with a listing of respective reference designators 210. As illustrated, the label of the reference designator for the changed parts may remain the same. This is consistent with the replacement part taking the place of the originally listed part.

Figure 4A:
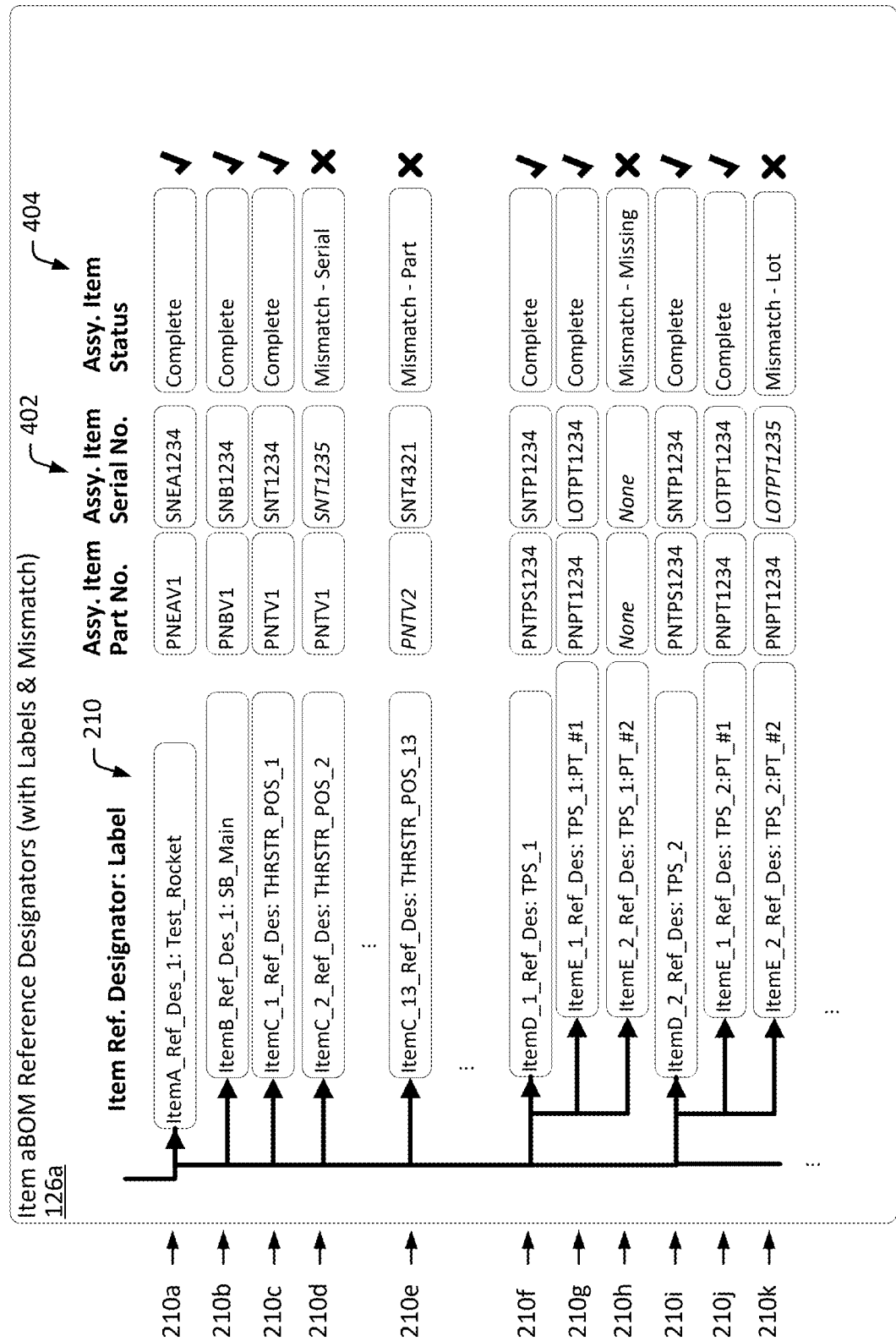
FIGS. 4A and 4B are diagrams that illustrate variations of an ABOM in accordance with one or more embodiments.
Figure 4B:
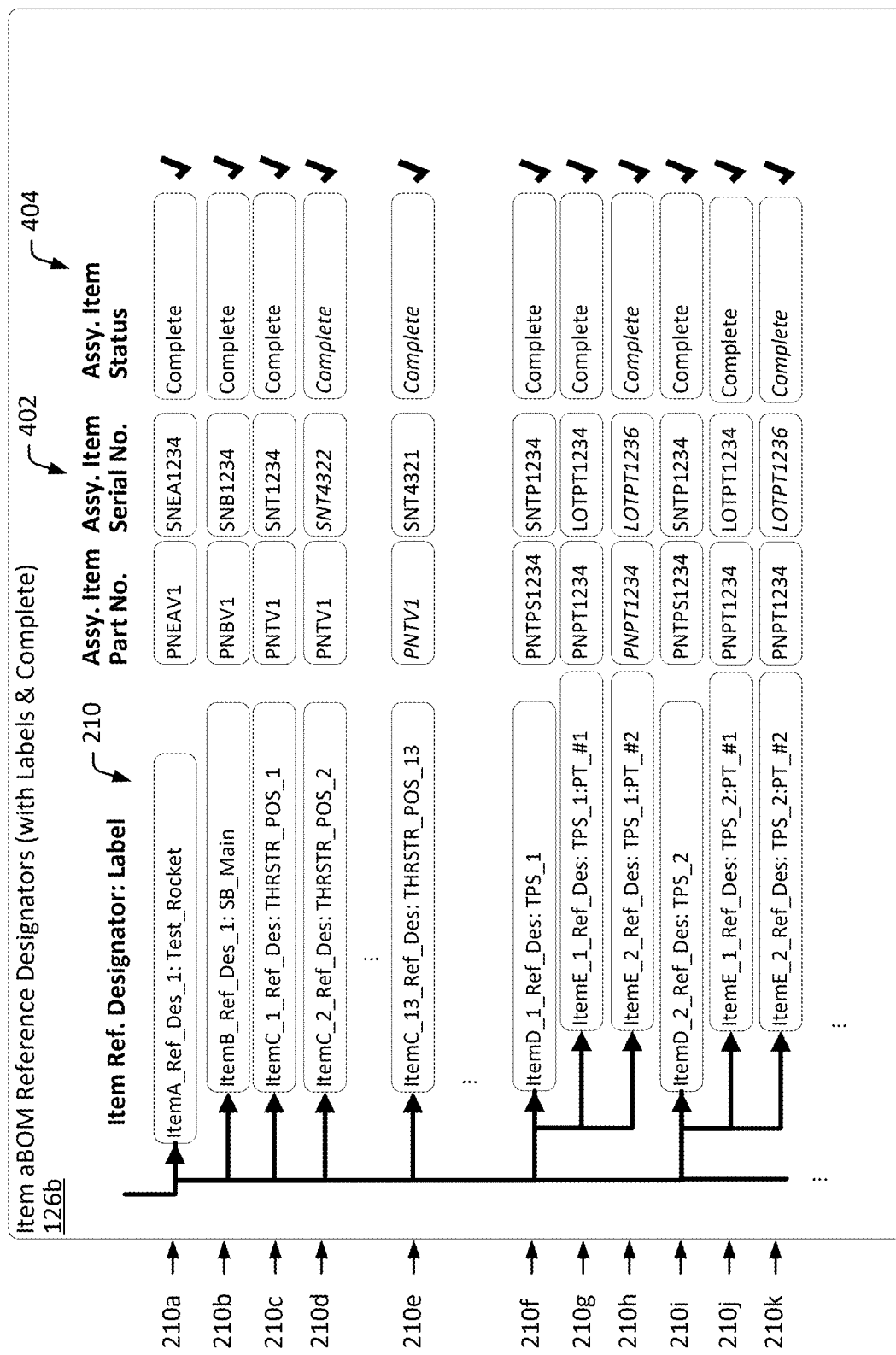

Further, a product assembly department may generate an actual assembled product, in some instance using the same, or a variation of, parts specified in a controlling BOM (e.g., EBOM 122 or 122 or a corresponding MBOM 124 or 124) and populate an ABOM 126 that reflects the parts actually used in the assembled product. For example, during assembly of the rocket engine assembly specified by EBOM 122 (or MBOM 124), a third user 104c (e.g., a technician), may pull parts from inventory and assemble them to assemble (or "build") the rocket engine assembly. As the parts are installed into the assembly, the technician may specifically identify the parts (e.g., by part number, serial number, lot number, description, or the like), and populate a parts information section of an ABOM 126 that corresponds to EBOM 122 (or MBOM 124), to specifically document parts used (e.g., by way of interaction with a graphical user interface served by controller 110 to a computer employed by the technician and displayed thereon). For example, ABOM 126 may include a listing of populated reference designators 210 (e.g., designators 210a-210k including reference designator identifies and labels) corresponding to hierarchical listing of parts 202 of EBOM 122a (or MBOM 124a) and include, for each part, one or more corresponding part information fields for recording information concerning the actual part used in the assembly for the listed part, such as the part number, serial number, lot number, description, or the like. Such an ABOM 126 can be particularly useful in tracking what specific parts (and combinations of parts) are actually installed in final/assembled products. FIGS. 4A and 4B are diagrams that illustrate ABOMs 126 in accordance with one or more embodiments. FIG. 4A is a diagram that illustrates a populated ABOM 126a including errors (e.g., "mismatches") between parts used and parts specified by the corresponding hierarchical listing of parts 202. FIG. 4B is a diagram that illustrates a populated ABOM 126b that is complete (e.g., including matches, and no errors (or "mismatches")) between parts used and parts specified by the corresponding hierarchical listing of parts 202. Each of ABOM 126a and 126b includes a listing of populated reference designators 210 (e.g., designators 210a-210k including reference designator identifiers and labels) corresponding to hierarchical listing of parts 202 of EBOM 122a (or MBOM 124a) and include corresponding part information fields 402 (for recording information concerning the actual part installed in the assembly for the listed part, such as the part number and serial/lot number) and assembly status fields 404 that indicates whether there is a mismatch between parts used and parts specified by the corresponding hierarchical listing of parts 202, or some other error, such as use of a "bad" part (e.g., identified by serial number or lot). As illustrated in the case of a mismatch (e.g., failure to place a part, or use of a wrong, bad, or incompatible part) may trigger a mismatch alert, such as those listed in assembly status fields 404. For example, "THRSTR_POS_2" may be determined to be a mismatch due to serial number "SNT1235" being a known bad part, "THRSTR_POS_13" may be determined to be a mismatch due to part number "PNTV2" being different than the corresponding part specified by the corresponding hierarchical listing of parts 202, "TPS_1:PT_#2" may be determined to be a mismatch due to no part being listed as installed, and "TPS_2:PT_#2" may be determined to be a mismatch due to lot number "LOTPT1235" being a prohibited for use based on it containing known bad parts. Thus, for example, a user 104, such as third user 104c (e.g., a technician or an inspector), can quickly determine that the current product assembly has issues, by simply reviewing assembly status fields 404. In response to reviewing, for example, assembly status fields 404 of ABOM 126a, a user 104, such as third user 104c (e.g., a technician) may swamp and install parts to correct the errors, and update corresponding part information fields 402, which, in turn, results in an updated and complete ABOM 126, such as ABOM 126b of FIG. 4B. Upon reviewing an ABOM 126 like that of ABOM 126b of FIG. 4B, a user 104, such as third user 104c (e.g., a technician or an inspector), can quickly determine that the current product assembly is complete and ready for next steps, such as advancement to a next assembly stage, testing, inspection, shipping, or the like.

In some embodiments, parts may be associated with a given identifier (e.g., a barcode, a QR code, or the like), and that identifier may be used to associate the part with a given reference designator or other item. For example, each part to be assembled may include a QR code disposed thereon that is associated with corresponding part information for the part (e.g., part name, part number, serial number, lot number, or the like). As a technician installs a part, the technician may select the reference designator corresponding to the location that the part is (or is about to be) installed into and scan the QR code with a mobile QR scanner application, which will, in turn, cause controller 110 to populate the corresponding part information fields 402 associated with the reference designator (e.g., "ItemC_2_Ref_Des:THR-STR_POS_2") with the part information associated with QR code and the part (e.g., part no: PNTV1; serial no. SNT4322).

In some embodiments, parts can be associated with corresponding data therefore, such as test data or other item data. For example, where the rocket engine assembly specified by EBOM 122a (or MBOM 124a) is subject to performance testing that includes monitoring, and generation of performance data for each of the parts of the assembly, such as the "rocket engine assembly," itself the "stage1_body," the thirteen "thrusters," the four "Turbo_Pump_Sensors," and the eight of "Pressure_Transducer_A". In such an embodiment, each of these parts may be monitored for corresponding performance characteristics, such as exit temperature, strain, thrust, revolutions per minute (RPM), and pressure, and corresponding test data may be generated therefore.

Figure 5:
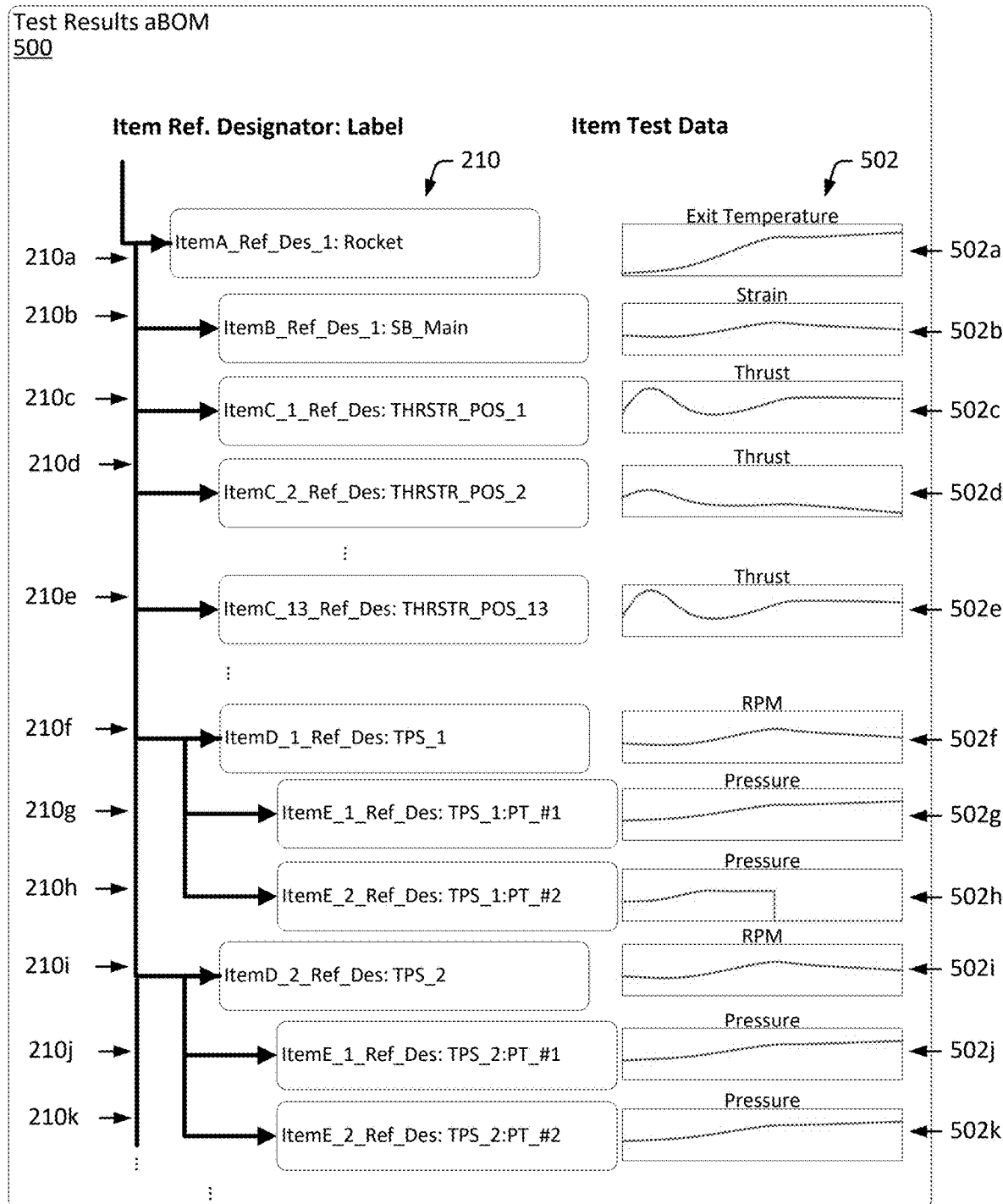
FIG. 5 is a diagram that illustrates example test data ABOM in accordance with one or more embodiments.

In some embodiments, test data for a given product is associated with the product, including association of portions of the test data with corresponding parts of the product. For example, where a test of the rocket engine assembly includes monitoring of the pressure of a specific one of installed "Pressure_Transducer_A", the resulting pressure data may be stored or otherwise associated with the specific installed instance of Pressure_Transducer_A (e.g., the data may be stored in association with the location of the part on the assembly (e.g., the second transducer of the second turbo pump sensor), or the lot or serial number of the part. In some embodiments, test data for a given product is associated with the product, including association of portions of the test data with corresponding reference designators for parts of the product. Continuing with the above example, test data for exit temperature, strain, thrust, revolutions per minute (RPM), and pressure test data may be stored, presented, or otherwise associated with respective ones of reference designators (e.g., including associated reference designator identifiers or labels) of illustrated reference designators 210 (e.g., designators 210a-210k). Such information and associations may be captured in a test results type item data ABOM 128. FIG. 5 is a diagram that illustrates an example test results type item data ABOM (or "test data ABOM") 128 in accordance with one or more embodiments. Test data ABOM 128 includes a listing of populated reference designators 210 (e.g., designators 210a-210k including reference designator identifiers and labels) corresponding to hierarchical listing of parts 202 of EBOM 122a (or MBOM 124a) and includes corresponding test information fields 502 (e.g., including test data fields 502a-502k). Each of test information fields 502 reflects corresponding test data 140 obtained for the corresponding part. For example, plots of test data fields 502a-502k correspond to respective sets of sensed data for each of the respective parts associated with designators 210a-210k. Such an association and presentation of data may enable user 104 to quickly assess information relating to specific parts of a product, which can, in turn, enable specific identification and remediation of issues with the product. For example, user 104c (e.g., a technician) may identify, based on the distinct drop off in pressure on the plot of test data field 502h and the associated label "TPS_1: PT_#2", that the pressure transducer located at transducer position #2 within the turbo pump sensor at turbo pump sensor location #1 is defective and needs to be replaced, and proceed to replacing the defective pressure transducer. Such a level of specificity may provide for efficient and effective monitoring and implementation of complex products.

In some embodiments, a record (or "snapshot") of a BOM can be created for a given point in time, such as before during or after a relevant event. For example, a snapshot of an ABOM 126b may be recorded between the time of completion of assembly of the rocket engine assembly and before conducting testing thereon, so an accurate representation of the product under test is available for interpretation of the resulting test data 140. Although embodiments are described with regard to association of BOM snapshots with test data, embodiments may be employed for any suitable context for associating BOMs with data. For example, a BOM snapshot may be taken at a relevant time (e.g., in response to an event) and data corresponding to the product represented by the BOM (e.g., information concerning the product at or around the time of an event) may be stored in association with the BOM as described with regard to at least FIG. 6. An event may, for example, include something that warrants recording of a current version of a BOM, such as a user selection (e.g., a selection to record the BOM), occurrence of a scheduled time, initiation/completion of testing of an associated product, initiation/completion of maintenance of an associated product, initiation/completion of moving of an associated product, initiation/completion of modification of an associated product, initiation/completion of assembly of an associated product, or the like. Detection of occurrence of such an event may trigger recording of the BOM.

Figure 6:
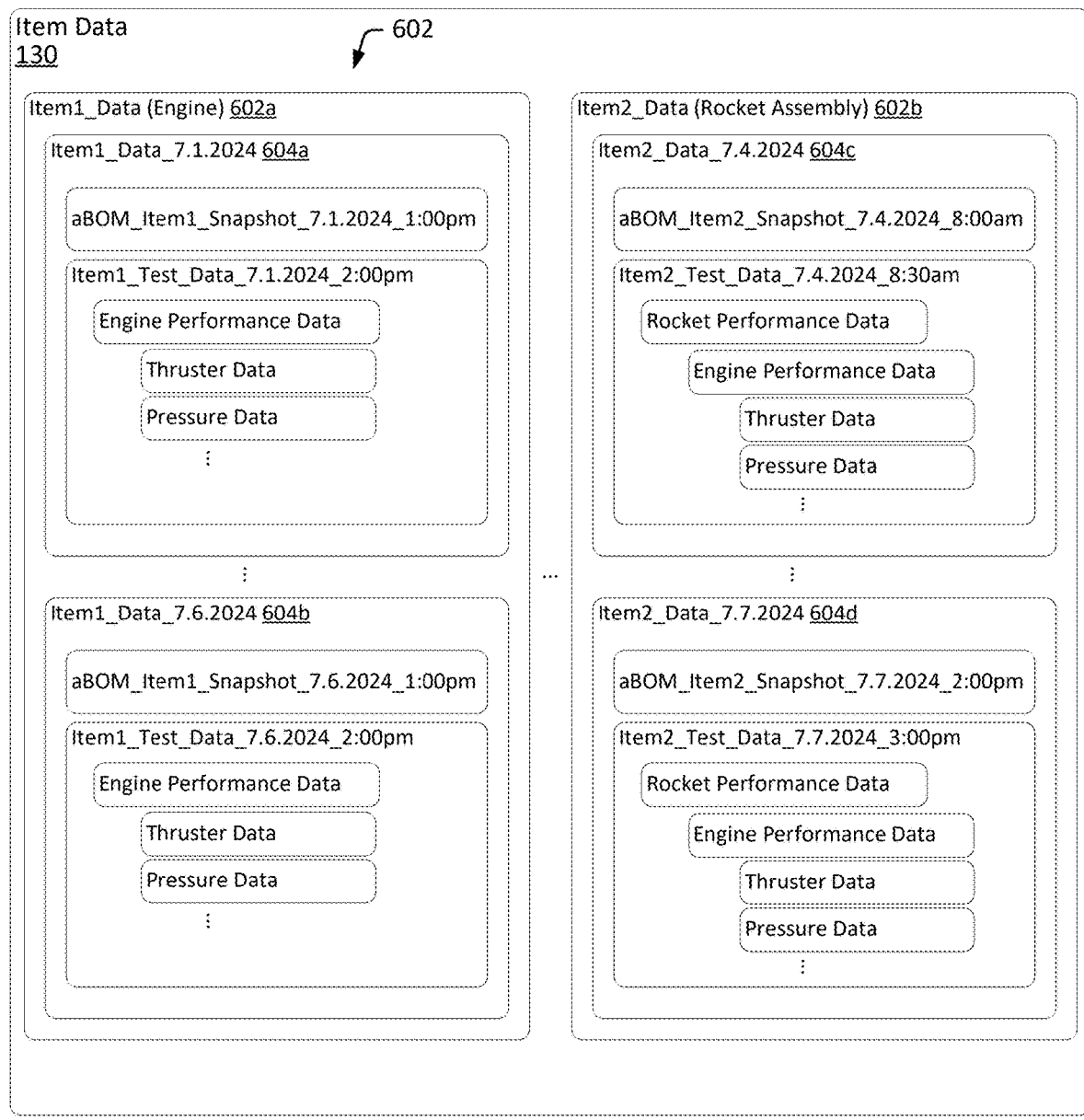
FIG. 6 is a diagram that illustrates example item data in accordance with one or more embodiments.

FIG. 6 is a diagram that illustrates example item data 130 in accordance with one or more embodiments. In the illustrated embodiment, item (or "product") data 130 includes subsets of item (or "product") data 602. Each subset of item data 602 includes data for a given item (or "product") 108. For example, item data 130 includes a first subset of item data 602a for a rocket engine product 108 (e.g., labeled "Item_1 Data (Engine)") and a second subset of item data 602b for a rocket assembly product 108 (e.g., labeled "Item_2 Data (Rocket Assembly)"). Each of the subsets of item data 602 include "product" subsets of item data 604. Each of product subsets of item data 604 includes data associated with a given time or version of an associated product 108. For example, a product subset of item data 604a for the "Item_1 Data (Engine)" (e.g., a subset of item data 602a) includes data for Jul. 1, 2024, including a snapshot of an ABOM 126 taken at 1:00 pm on Jul. 1, 2024, and corresponding set of test data 140a acquired at 2:00 pm on Jul. 1, 2024, during a test of an engine product 108 having an assembled configuration that corresponds to the configuration listed in ABOM 126. Similarly, a product subset of item data 604b for the "Item_1 Data (Engine)" (e.g., a subset of item data 602a) includes data for Jul. 6, 2024, a product subset of item data 604c for the "Item_2 Data (Rocket Assembly)" (e.g., a subset of item data 602b) includes data for a rocket assembly product 108 on Jul. 4, 2024, and product subset of item data 604*d* for the "Item_2 Data (Rocket Assembly)" (e.g., a subset of item data 602*b*) includes data for a rocket assembly product 108 on Jul. 7, 2024. Although two products (e.g., engine and rocket assembly) and two product subsets of item data for each product are illustrated, item data 130 may include any number of subsets of item data with any number of product subsets of item data. As described, the association with snapshots of BOMs enables knowledge of a configuration of a product at or near a time corresponding to the associated data, such as test data 140. Although certain embodiments are described in the context of product subsets of item data 604 including product/part test data associated with a corresponding BOM snapshot for the purpose of explanation, embodiments may include storing any suitable data in product subsets of item data 604. For example, product subsets of item data 604 may include a one or more of a BOM snapshot, test data, and metadata for parts or assemblies, such as part/product type source, status (e.g., good/bad) maintenance documentation, current/historical location, user notes/comments, date/location of manufacture, expiration date, or the like. Such metadata may, for example, be provided by way of item assembly information 132, such as item labels 132, item part information 138, or test data 140 provided by a user 104 or other entity for corresponding parts of an item assembly definition 134. Such embodiments may enable various types of data to be stored in association with a given part by way of association with a corresponding identifier, such as a part label of a reference designator 210.

Figure 7:
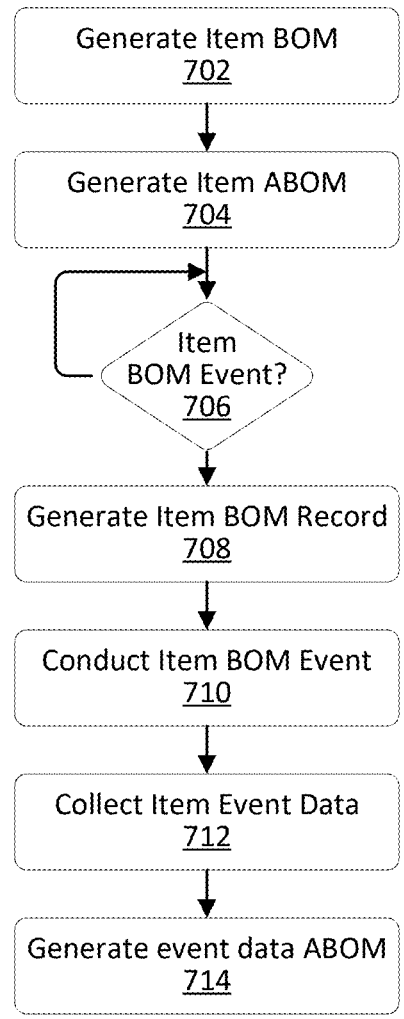
FIG. 7 is a flowchart diagram that illustrates a method of item assembly management in accordance with one or more embodiments.

FIG. 7 is a flowchart diagram that illustrates a method of item assembly management 700 in accordance with one or more embodiments. Some or all of the procedural elements of method 500 may be performed, for example, by controller 110, a user 104, or another entity.

Method 700 may include generating an item BOM (block 702). This may include generating a BOM, such as an EBOM or an MBOM, that defines a hierarchical listing of items (or "parts") for an item assembly (or "product"). For example, generating an item BOM may include item management module 114 generate, based on item assembly definition 134 and reference labels 136 (e.g., received from a user 104), a corresponding BOM 120, such as EBOM 122 or MBOM 124, including a hierarchical listing of items (or "parts") 202 for an item assembly (or "product") 108.

Method 700 may include generating an item ABOM (block 704). This may include generating an ABOM that includes a listing of unique identifiers for individual parts of an associated product. For example, generating an item ABOM may include item management module 114 generating, based on a hierarchical listing of parts 202 of a BOM 120, such as EBOM 122 or MBOM 124, for a product 108, a corresponding listing of reference identifiers for each of some or all of the parts of the listing of parts 202, prompting a user 104 to provide a set of labels for the reference identifiers, receiving, from the user 104, a set of reference labels 136, populating a set of reference designators 210 with the corresponding reference identifiers and reference labels of the set of reference labels 136, and generating an ABOM 126 including the set of reference designators 210 (e.g., as illustrated FIG. 4A or FIG. 4B). In some embodiments, generation of the ABOM 126 include item management module 114 populating corresponding part information fields 402 with associated information, such as item part information provided by a user 104).

Method 700 may include determining occurrence of an item BOM event (block 706). This may include determining an event that warrants recording of a current version of a BOM, such as a user selection, occurrence of a scheduled time, initiation/completion of testing of an associated product, initiation/completion of maintenance of an associated product, initiation/completion of moving of an associated product, initiation/completion of modification of an associated product, initiation/completion of assembly of an associated product, or the like. For example, determining occurrence of an item BOM event may include item management module 114 determining, based on input from a user or a test schedule, initiation of testing of product 108.

Method 700 may include generating an item BOM record (block 708). This may include generating a snapshot of a BOM in response to determining occurrence of an item BOM event. For example, generating an item BOM record may include item management module 114, in response to determining initiation of testing of product 108 at 1:00 pm on Jul. 7, 2024, generating a snapshot of ABOM 126 at 1:00 pm on Jul. 7, 2024.

Method 700 may include conducting an item BOM event (block 710) and collecting item BOM event data (block 708). This may include conducting an item BOM event, such as testing of an associated product, and acquiring associated data, such as test results data for the product. For example, conducting an item BOM event and collecting item BOM event data may include controller 110, a user 104 or the like conducting testing of product 108 at 2:00 pm on Jul. 7, 2024, and collecting associated test data 140, and item management module 114 obtaining the test data 140, and storing the test data 140 in association with the snapshot of ABOM 126 at 1:00 pm on Jul. 7, 2024 (e.g., in product data subset 604*a*).

Method 700 may include generating an event data BOM (block 714). This may include generating a BOM or similar document hat associated snapshot of a BOM in response to determining occurrence of an item BOM event. For example, generating an item BOM record may include item management module 114 generating a test results type item data ABOM 128, like that of FIG. 5, including a listing of populated reference designators 210 (e.g., designators 210*a*-210*k* including reference designator identifiers and labels) corresponding to hierarchical listing of parts 202 of EBOM 122*a* (or MBOM 124*a*) and including corresponding test information fields 502 (e.g., including test data fields 502*a*-502*k*).

Figure 8:
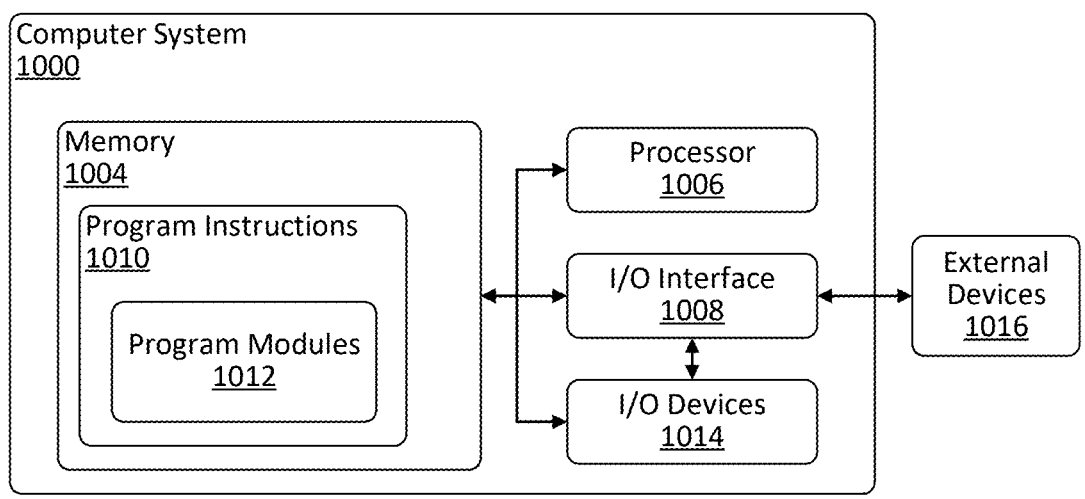
FIG. 8 is a diagram that illustrates an example computer system in accordance with one or more embodiments.

FIG. 8 is a diagram that illustrates an example computer system (or "system") 1000 in accordance with one or more embodiments. The system 1000 may include a memory 1004, a processor 1006 and an input/output (I/O) interface 1008. The memory 1004 may include non-volatile memory (e.g., flash memory, read-only memory (ROM), programmable read-only memory (PROM), erasable programmable read-only memory (EPROM), electrically erasable programmable read-only memory (EEPROM)), volatile memory (e.g., random access memory (RAM), static random access memory (SRAM), synchronous dynamic RAM (SDRAM)), or bulk storage memory (e.g., CD-ROM or DVD-ROM, hard drives). The memory 1004 may include a non-transitory computer-readable storage medium having program instructions 1010 stored on the medium. The program instructions 1010 may include program modules 1012 that are executable by a computer processor (e.g., the processor 1006) to cause the functional operations described, such as those described with regard to the entities described (e.g., management system 102, users 104, item management module 114), or method 700.

The processor 1006 may be any suitable processor capable of executing program instructions. The processor 1006 may include one or more processors that carry out program instructions (e.g., the program instructions of the program modules 1012) to perform the arithmetical, logical, or input/output operations described. The processor 1006 may include multiple processors that can be grouped into one or more processing cores that each include a group of one or more processors that are used for executing the processing described here, such as the independent parallel processing of partitions (or "sectors") by different processing cores to generate a simulation of a reservoir. The I/O interface 1008 may provide an interface for communication with one or more I/O devices 1014, such as a joystick, a computer mouse, a keyboard, or a display screen (e.g., an electronic display for displaying a graphical user interface (GUI)). The I/O devices 1014 may include one or more of the user input devices. The I/O devices 1014 may be connected to the I/O interface 1008 by way of a wired connection (e.g., an Industrial Ethernet connection) or a wireless connection (e.g., a Wi-Fi connection). The I/O interface 1008 may provide an interface for communication with one or more external devices 1016, computer systems, servers or electronic communication networks. In some embodiments, the I/O interface 1008 includes an antenna or a transceiver.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described here are to be taken as examples of embodiments. Elements and materials may be substituted for those illustrated and described here, parts and processes may be reversed or omitted, and certain features of the embodiments may be utilized independently, all as would be apparent to one skilled in the art after having the benefit of this description of the embodiments. Changes may be made in the elements described here without departing from the spirit and scope of the embodiments as described in the following claims. Headings used here are for organizational purposes only and are not meant to be used to limit the scope of the description.

It will be appreciated that the processes and methods described here are example embodiments of processes and methods that may be employed in accordance with the techniques described here. The processes and methods may be modified to facilitate variations of their implementation and use. The order of the processes and methods and the operations provided may be changed, and various elements may be added, reordered, combined, omitted, modified, and so forth. Portions of the processes and methods may be implemented in software, hardware, or a combination thereof. Some or all of the portions of the processes and methods may be implemented by one or more of the processors/modules/applications described here.

As used throughout this application, the word "may" is used in a permissive sense (meaning having the potential to), rather than the mandatory sense (meaning must). The words "include," "including," and "includes" mean including, but not limited to. As used throughout this application, the singular forms "a," "an," and "the" include plural referents unless the content clearly indicates otherwise. Thus, for example, reference to "an element" may include a combination of two or more elements. As used throughout this application, the term "or" is used in an inclusive sense, unless indicated otherwise. That is, a description of an element including A or B may refer to the element including one or both of A and B. As used throughout this application, the phrase "based on" does not limit the associated operation to being solely based on a particular item. Thus, for example, processing "based on" data A may include processing based at least in part on data A and based at least in part on data B, unless the content clearly indicates otherwise. As used throughout this application, the term "from" does not limit the associated operation to being directly from. Thus, for example, receiving an item "from" an entity may include receiving an item directly from the entity or indirectly from the entity (e.g., by way of an intermediary entity). Unless specifically stated otherwise, as apparent from the discussion, it is appreciated that throughout this specification discussions utilizing terms such as "processing," "computing," "calculating," "determining," or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical, electronic or magnetic quantities within memories, registers, or other information storage devices, transmission devices, or display devices of the special purpose computer or similar special purpose electronic processing/computing device.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

What is claimed is:

1. A system for automatically configuring a rocket assembly controller, the system comprising:
    an item test system configured to obtain test data concerning testing of an rocket assembly, the item test system comprising:
    the rocket assembly comprising:
    a first set of parts; and
    a controller configured in a first operational configuration that corresponds to the first set of parts; and
    a sensor system configured to obtain test data for the rocket assembly; and
    an item management system configured to perform the following operations for rocket assembly testing:
    obtaining rocket assembly information defining a configuration of parts of the rocket assembly;
    generating, based on the rocket assembly information, an rocket bill of materials (BOM) for the rocket assembly, the BOM for the rocket assembly comprising a listing of parts corresponding to an arrangement of parts defined by the rocket assembly information;
    generating, based on the listing of parts, a set of reference designators comprising a reference designator for each part of the listing of parts;
    obtaining an rocket label set defining, for each reference designator of the set of reference designators, a label;
    generating, based on the rocket label set and the set of reference designators, an assembly bill of materials (ABOM), the ABOM comprising, for each part of the listing of parts, the label for the reference designator associated with the part;

determining an event time corresponding to a time that testing of the rocket assembly is scheduled to occur;

generating, responsive to determining the event time corresponding to the time that the testing of the rocket assembly is scheduled to occur, a record of the ABOM at the event time such that the ABOM corresponds to a version of the rocket assembly subject to the test;

obtaining, by way of the sensor system based on the test of the rocket assembly conducted using the rocket test system, test data for one or more parts of the rocket assembly, the rocket assembly tested having a configuration corresponding to a configuration of parts specified the ABOM;

generating, based on the test data obtained by way of the sensor system for one or more parts of the rocket assembly and the record of the ABOM, a test results ABOM comprising, for each of one or more parts of the rocket assembly, test data for the part associated with the label for the reference designator associated with the part;

identifying, based on the test results ABOM, a failure of a given part of the rocket assembly;

the given part of the rocket assembly replaced, based on the identification of the failure of the given part and the label for the reference designator associated with the given part, with a replacement part to generate a modified rocket assembly comprising a second set of parts;

determining a modified ABOM that corresponds to the second set of parts;

determining, based on the modified ABOM, a second operational configuration that corresponds to the second set of parts; and configuring, based on the modified ABOM, the controller of the rocket assembly in a second operational configuration that corresponds to the second set of parts.

2. The system of claim 1, wherein the BOM for the rocket assembly is modified based on the test results ABOM.

3. The system of claim 1, wherein modifying of the rocket assembly comprises modifying a part of the rocket assembly to generate the modified rocket assembly, the operations further comprising:

receiving part information indicating the modification of the part of the rocket assembly;

generating, based on the part information indicating the modification of the part of the rocket assembly, a modified ABOM reflecting the modification of the part of the rocket assembly;

generating, for a test of the modified rocket assembly, a record of the modified ABOM;

obtaining, based on the test of the modified rocket assembly, test data for one or more parts of the modified rocket assembly; and generating, based on the test data for one or more parts of the modified rocket assembly and the record of the modified ABOM, a second test results ABOM comprising, for each of one or more parts of the modified rocket assembly, test data for the part associated with the label for the reference designator associated with the part.

4. The system of claim 1, the operations further comprising:

for one or more parts of the rocket assembly:
receiving, part information concerning an actual part implemented for the part,
wherein the ABOM comprises the part information associated with the label of the reference designator associated with the part.

5. The system of claim 4, wherein the part information comprises metadata for the actual part implemented for the part.

6. The system of claim 1, the operations further comprising:

for one or more parts of the rocket assembly:
receiving part information indicating information concerning an actual part implemented for the part;
determining, based on the information concerning the actual part implemented for the part, a part match or mismatch,
wherein the ABOM comprises an indication of the part match or mismatch associated with the label for the reference designator associated with the part.

7. The system of claim 1, the operations further comprising:

generating a modified ABOM for the modified rocket assembly; and
configuring, based on the modified ABOM, the modified rocket assembly.

8. The system of claim 7, wherein the modified rocket assembly comprises a control system configured to control operation of the modified rocket assembly, and wherein configuring the modified rocket assembly comprises:

determining, based on the modified ABOM, an updated control configuration that correspond to components of the modified rocket assembly; and
configuring the control system of the modified rocket assembly in accordance with the updated control configuration.

9. The system of claim 7, the operations further comprising:

determining, based on the ABOM, a first operational configuration, wherein testing of the rocket assembly is conducted with the rocket assembly configured in accordance with the first operational configuration, and
wherein configuring the modified rocket assembly comprises:
determining, based on the modified ABOM, a second operational configuration; and
configuring the modified rocket assembly in accordance with the second operational configuration.

10. The system of claim 1, wherein the first set of parts comprises a first device provided at a first location in the rocket assembly and configured to operate using a first communication protocol,
wherein the first operational configuration comprises the controller configured to use a first communication protocol to communicate with the first device,
wherein the second set of parts comprises a second device provided in place of the first device at the first location in the rocket assembly and the second device is configured to operate using a second communication protocol,
wherein the modified ABOM associates the second device with the first location, and
wherein the second operational configuration comprises the controller configured to use the second communication protocol to communicate with the second device at the first location.

11. A method of automatically configuring an rocket assembly controller comprising:
- obtaining rocket assembly information defining a configuration of parts of an rocket assembly, the rocket assembly comprising:
- a first set of parts; and
- a controller configured in a first operational configuration that corresponds to the first set of parts;
- generating, based on the rocket assembly information, an rocket bill of materials (BOM) for the rocket assembly, the BOM for the rocket assembly comprising a listing of parts corresponding to an arrangement of parts defined by the rocket assembly information;
- generating, based on the listing of parts, a set of reference designators comprising a reference designator for each part of the listing of parts;
- obtaining an rocket label set defining, for each reference designator of the set of reference designators, a label;
- generating, based on the rocket label set and the set of reference designators, an assembly bill of materials (ABOM), the ABOM comprising, for each part of the listing of parts, the label for the reference designator associated with the part;
- determining an event time corresponding to a time that testing of the rocket assembly is scheduled to occur;
- generating, responsive to determining the event time corresponding to the time that the testing of the rocket assembly is scheduled to occur, a record of the ABOM at the event time such that the ABOM corresponds to a version of the rocket assembly subject to the test;
- obtaining, based on the test of the rocket assembly, test data for one or more parts of the rocket assembly, the rocket assembly tested having a configuration corresponding to a configuration of parts specified the ABOM, the test data obtained by way of a sensor system; and
- generating, based on the test data for one or more parts of the rocket assembly and the record of the ABOM, a test results ABOM comprising, for each of one or more parts of the rocket assembly, test data for the part associated with the label for the reference designator associated with the part;
- identifying, based on the test results ABOM, a failure of a given part of the rocket assembly;
- the given part of the rocket assembly replaced, based on the identification of the failure of the given part and the label for the reference designator associated with the given part, with a replacement part to generate a modified rocket assembly comprising a second set of parts;
- determining a modified ABOM that corresponds to the second set of parts;
- determining, based on the modified ABOM, a second operational configuration that corresponds to the second set of parts; and
- configuring, based on the modified ABOM, the controller of the rocket assembly in a second operational configuration that corresponds to the second set of parts.

12. The method of claim 11, wherein the BOM for the rocket assembly is modified based on the test results ABOM.

13. The method of claim 11, wherein modifying of the rocket assembly comprises modifying a part of the rocket assembly to generate the modified rocket assembly, the operations further comprising:
- receiving part information indicating the modification of the part of the rocket assembly;
- generating, based on the part information indicating the modification of the part of the rocket assembly, a modified ABOM reflecting the modification of the part of the rocket assembly;
- generating, for a test of the modified rocket assembly, a record of the modified ABOM;
- obtaining, based on the test of the modified rocket assembly, test data for one or more parts of the modified rocket assembly; and
- generating, based on the test data for one or more parts of the modified rocket assembly and the record of the modified ABOM, a second test results ABOM comprising, for each of one or more parts of the modified rocket assembly, test data for the part associated with the label for the reference designator associated with the part.

14. The method of claim 11, further comprising:
for one or more parts of the rocket assembly:
- receiving, part information concerning an actual part implemented for the part,
- wherein the ABOM comprises the part information associated with the label of the reference designator associated with the part.

15. The method of claim 14, wherein the part information comprises metadata for the actual part implemented for the part.

16. The method of claim 11, further comprising:
for one or more parts of the rocket assembly:
- receiving part information indicating information concerning an actual part implemented for the part;
- determining, based on the information concerning the actual part implemented for the part, a part match or mismatch,
- wherein the ABOM comprises an indication of the part match or mismatch associated with the label for the reference designator associated with the part.

17. The method of claim 11, further comprising:
- generating a modified ABOM for the modified rocket assembly; and
- configuring, based on the modified ABOM, the modified rocket assembly.

18. The method of claim 17, wherein the modified rocket assembly comprises a control system configured to control operation of the modified rocket assembly, and wherein configuring the modified rocket assembly comprises:
- determining, based on the modified ABOM, an updated control configuration that correspond to components of the modified rocket assembly; and
- configuring the control system of the modified rocket assembly in accordance with the updated control configuration.

19. The method of claim 17, further comprising:
- determining, based on the ABOM, a first operational configuration, wherein testing of the rocket assembly is conducted with the rocket assembly configured in accordance with the first operational configuration, and
- wherein configuring the modified rocket assembly comprises:
  - determining, based on the modified ABOM, a second operational configuration; and
  - configuring the modified rocket assembly in accordance with the second operational configuration.

20. The method of claim 11,
wherein the first set of parts comprises a first device provided at a first location in the rocket assembly and configured to operate using a first communication protocol, wherein the first operational configuration comprises the controller configured to use a first communication protocol to communicate with the first device, wherein the second set of parts comprises a second device provided in place of the first device at the first location in the rocket assembly and the second device is configured to operate using a second communication protocol, wherein the modified ABOM associates the second device with the first location, and wherein the second operational configuration comprises the controller configured to use the second communication protocol to communicate with the second device at the first location.

21. A non-transitory computer readable storage medium comprising program instructions stored thereon that are executable by a processor to perform the following operations for automatically configuring an rocket assembly controller:

obtaining rocket assembly information defining a configuration of parts of an rocket assembly the rocket assembly comprising:

a first set of parts; and a controller configured in a first operational configuration that corresponds to the first set of parts;

generating, based on the rocket assembly information, an rocket bill of materials (BOM) for the rocket assembly, the BOM for the rocket assembly comprising a listing of parts corresponding to an arrangement of parts defined by the rocket assembly information;

generating, based on the listing of parts, a set of reference designators comprising a reference designator for each part of the listing of parts;

obtaining an rocket label set defining, for each reference designator of the set of reference designators, a label;

generating, based on the rocket label set and the set of reference designators, an assembly bill of materials (ABOM), the ABOM comprising, for each part of the listing of parts, the label for the reference designator associated with the part;

determining an event time corresponding to a time that testing of the rocket assembly is scheduled to occur;

generating, responsive to determining the event time corresponding to the time that the testing of the rocket assembly is scheduled to occur, a record of the ABOM at the event time such that the ABOM corresponds to a version of the rocket assembly subject to the test;

obtaining, based on the test of the rocket assembly, test data for one or more parts of the rocket assembly, the rocket assembly tested having a configuration corresponding to a configuration of parts specified the ABOM, the test data obtained by way of a sensor system; and generating, based on the test data for one or more parts of the rocket assembly and the record of the ABOM, a test results ABOM comprising, for each of one or more parts of the rocket assembly, test data for the part associated with the label for the reference designator associated with the part;

identifying, based on the test results ABOM, a failure of a given part of the rocket assembly;

the given part of the rocket assembly replaced, based on the identification of the failure of the given part and the label for the reference designator associated with the given part, with a replacement part to generate a modified rocket assembly comprising a second set of parts;

determining a modified ABOM that corresponds to the second set of parts;

determining, based on the modified ABOM, a second operational configuration that corresponds to the second set of parts; and configuring, based on the modified ABOM, the controller of the rocket assembly in a second operational configuration that corresponds to the second set of parts.

22. The medium of claim 21, the operations further comprising:

generating a modified ABOM for the modified rocket assembly; and configuring, based on the modified ABOM, the modified rocket assembly.

23. The medium of claim 22, wherein the modified rocket assembly comprises a control system configured to control operation of the modified rocket assembly, and wherein configuring the modified rocket assembly comprises:

determining, based on the modified ABOM, an updated control configuration that correspond to components of the modified rocket assembly; and configuring the control system of the modified rocket assembly in accordance with the updated control configuration.

24. The medium of claim 22, the operations further comprising:

determining, based on the ABOM, a first operational configuration, wherein testing of the rocket assembly is conducted with the rocket assembly configured in accordance with the first operational configuration, and wherein configuring the modified rocket assembly comprises:

determining, based on the modified ABOM, a second operational configuration; and configuring the modified rocket assembly in accordance with the second operational configuration.

25. The medium of claim 21, wherein the first set of parts comprises a first device provided at a first location in the rocket assembly and configured to operate using a first communication protocol, wherein the first operational configuration comprises the controller configured to use a first communication protocol to communicate with the first device, wherein the second set of parts comprises a second device provided in place of the first device at the first location in the rocket assembly and the second device is configured to operate using a second communication protocol, wherein the modified ABOM associates the second device with the first location, and wherein the second operational configuration comprises the controller configured to use the second communication protocol to communicate with the second device at the first location.

* * * * *